P. P. ALIEX.
CLUTCH.
APPLICATION FILED DEC. 30, 1914.

1,182,831. Patented May 9, 1916.
3 SHEETS—SHEET 1.

Witnesses

Inventor
P. P. Aliex.
By
Attorney

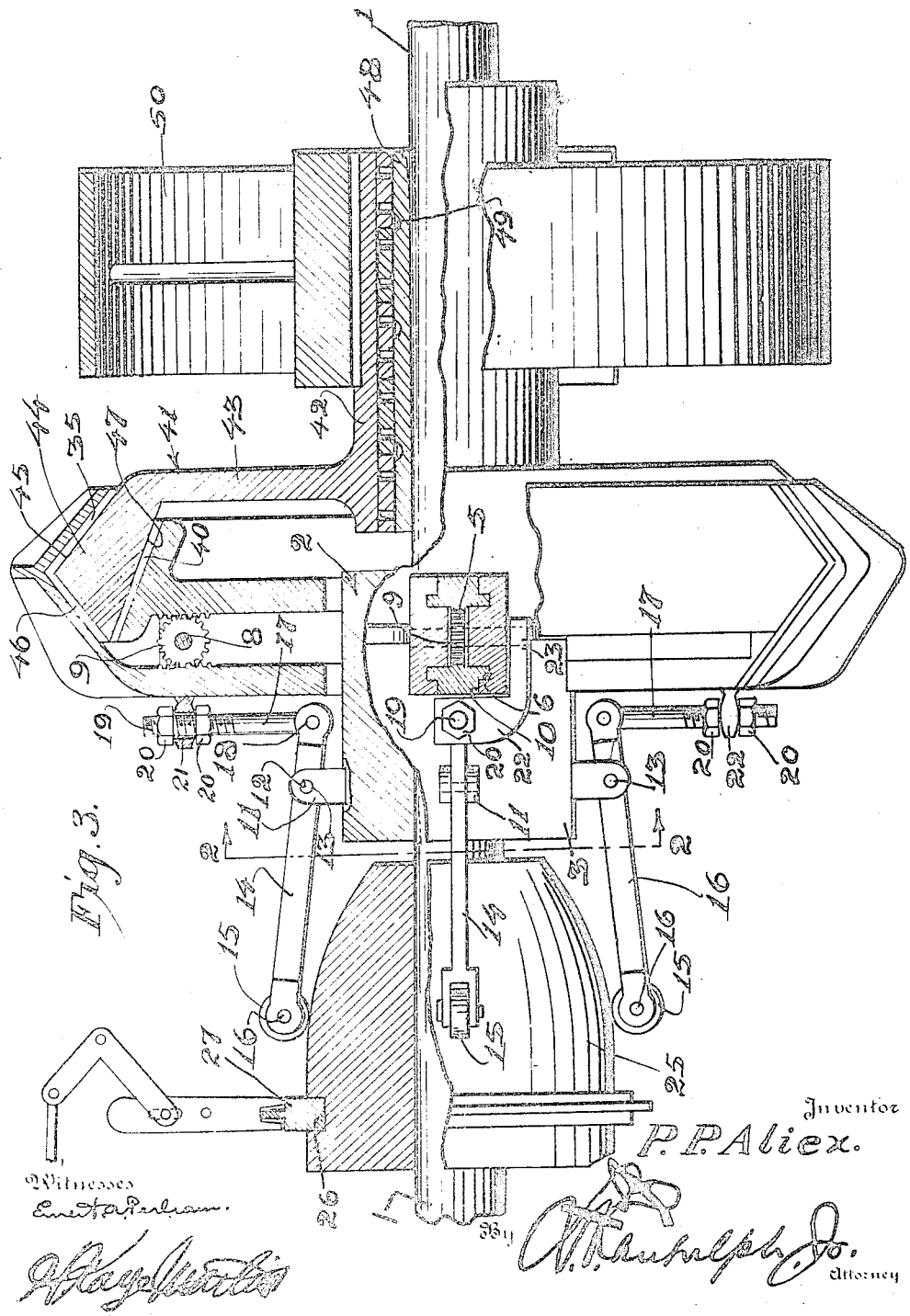

UNITED STATES PATENT OFFICE.

PAUL P. ALIEX, OF NORWOOD, MASSACHUSETTS.

CLUTCH.

1,182,831.  Specification of Letters Patent.  Patented May 9, 1916.

Application filed December 30, 1914. Serial No. 879,755.

*To all whom it may concern:*

Be it known that I, PAUL P. ALIEX, a citizen of the United States, residing at Norwood, in the county of Norfolk and State of Massachusetts, have invented certain new and useful Improvements in Clutches; and I do hereby declare the following to be a full, clear, and exact description of the invention, such as will enable others skilled in the art to which it appertains to make and use the same.

This invention relates to new and useful improvements in clutches, and has for its principal object to provide a simple and efficient friction clutch which will effectively lock a pair of rotating elements together.

Another object of the invention is to provide a clutch of the friction type which is particularly simple in construction and designed to form an effective lock between a drive shaft and the shaft which is to be driven.

A further object of the invention is to provide a novel means for establishing such a connection which may be controlled by the sliding of a spool on one of the shafts.

Figure 1:
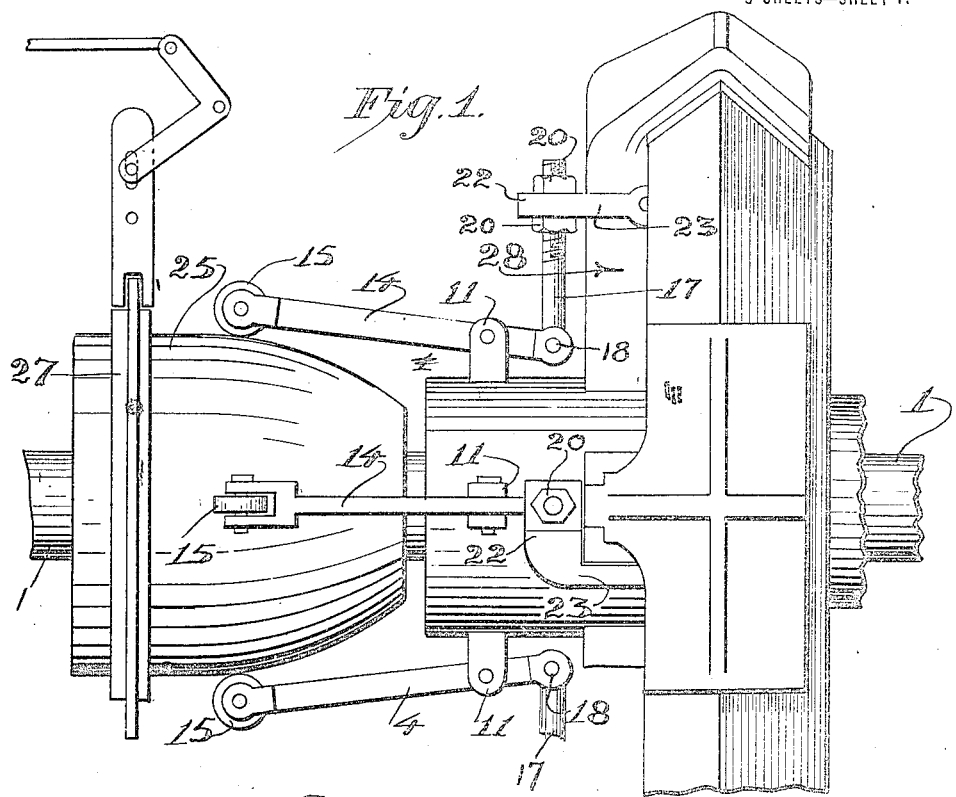
Figure 4:
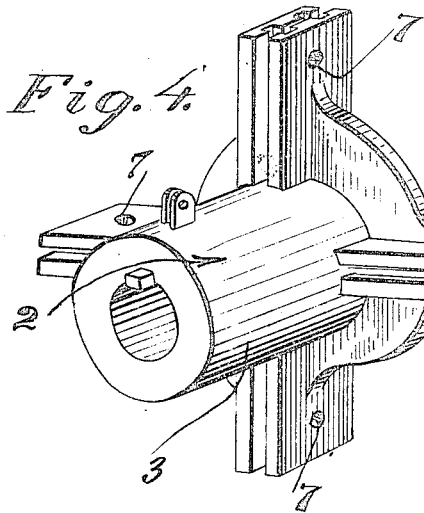
Figure 5:
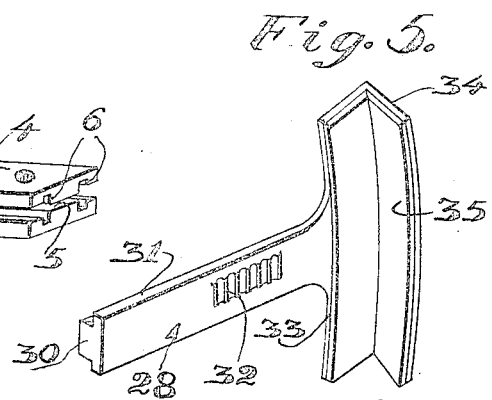
Figure 2:
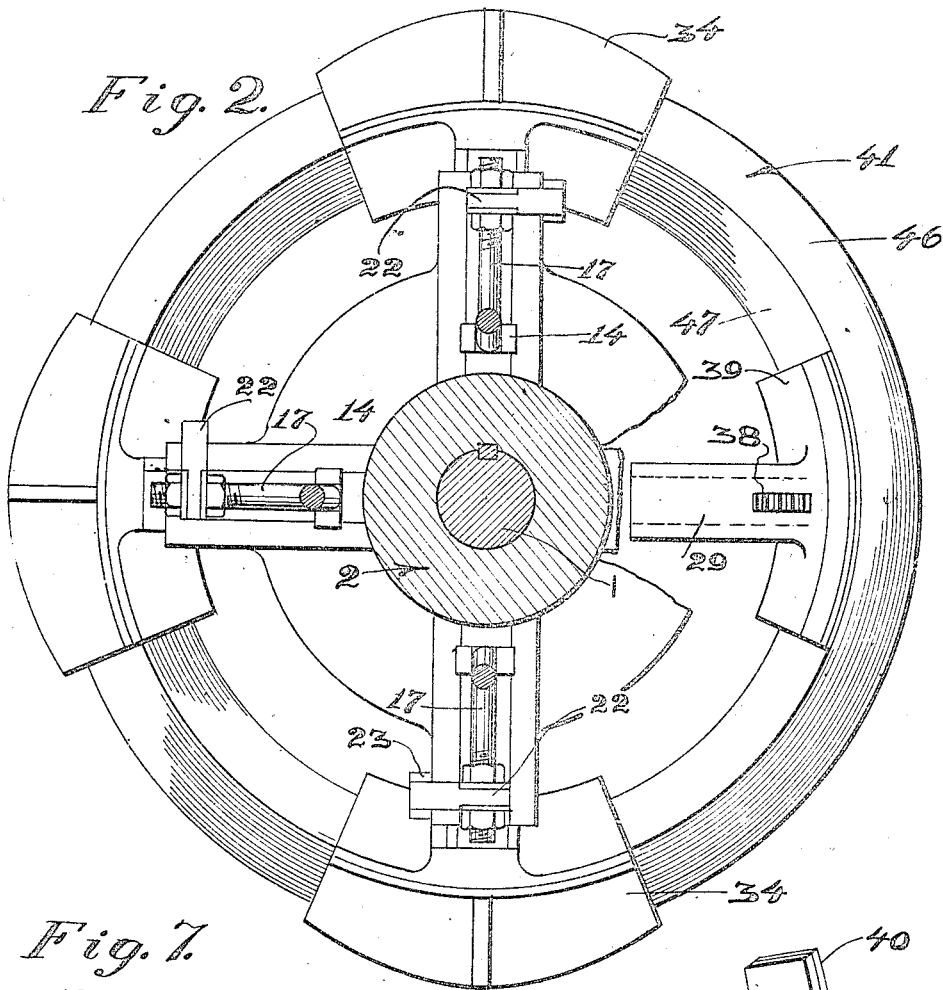
Figure 7:
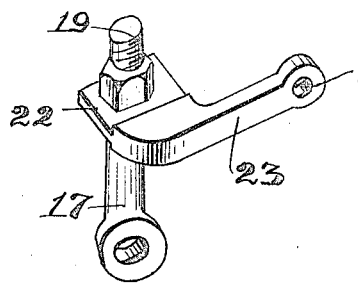
Figure 6:
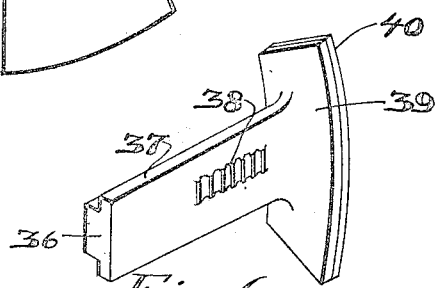

Figure 1 is a view in elevation of a clutch constructed in accordance with this invention. Fig. 2 is a face view of Fig. 1 showing a portion of the clutch in section to more clearly illustrate the details thereof. Fig. 3 is a longitudinal sectional view of the clutch illustrating the details of construction of the several parts. Fig. 4 is a perspective view of the spider on which the clutch elements are mounted. Fig. 5 is a detail perspective view of one of the outer clutch members, Fig. 6 is a detail perspective view of one of the inner clutch members, and Fig. 7 is a detail perspective view of the operating lever and rod.

Referring now to the drawings by characters of reference, the numeral 1 designates the drive shaft of the device to which the clutch is secured. This drive shaft is mounted in the usual bearings and has keyed thereto the spider 2 which is best illustrated in Fig. 4. This spider 2 comprises the hub 3 which is splined, keyed, or otherwise secured to the shaft 1 and the arms 4, which arms extend radially from the hub and are slotted as at 5. These slots in the arms extend in a plane parallel with the longitudinal axis of the hub and are provided with the grooves 6 which are spaced inwardly from the lateral edges of the arms and form guides for the members illustrated in Figs. 5 and 6. Each of these arms is provided with the transverse aperture 7 through which the shaft 8, on which the gear wheel 9 is mounted, extends. These apertures are designed to permit the shaft to rotate in order that the wheel 9 may be turned. The portions of the slots between the outer extremities of the grooves 6 are preferably wider as at 10 in order to receive the body of the clutch members above mentioned. Formed on the hub 3 in direct alinement with the arms are provided the ears 11 which are spaced from each other and apertured as at 12 to receive the pins 13 on which the levers, which will be more fully hereinafter described, are pivotally mounted.

The levers above referred to, are designated by the numeral 14, and are bifurcated at one end to receive the wheel 15 which rotates on the pin 16. The opposite ends of the levers are pivotally connected as at 18 to the stem 17 which is provided with the screw threads 19 at its upper end to receive the nuts 20 to regulate the movement of the lever 14 and the rotation of the gear wheel 9. This screw threaded portion is designed to extend through the aperture 21 formed in the angular extension 22 of the lever 23, which lever is apertured as at 24 to receive the protruding end of the shaft 8 on which the gear wheel 9 is mounted.

In order that the levers 14 may be operated, there is provided the cone 25 which is provided near one end with the groove 26 in which the ring 27 is held. This ring 27 is designed to be supported on a suitable controlling lever so that the cone 25 may be slid longitudinally on the shaft 1 so as to move the levers 14 respectively.

Slidable in the grooves formed in the arms of the spider are the outer and inner clutch members designated respectively by the numerals 28 and 29. The outer clutch member 28 comprises the body 30 having formed thereon the lateral flanges 31, which flanges are designed to slide in the grooves 6, while the body slides in the enlargement 10. The flanges 31 come flush with one of the faces of the body and this face is provided with a series of gear teeth 32 which are designed to mesh with the gear wheel 9, and upon rotation of said wheel, move the body relatively. Formed at one end of the body is the arcuate extension 33 which forms a friction plate for engagement with the coöperating clutch member, and this plate 32 is bent as at 34 to conform to the shape of the outer side of the coöperating clutch member. A suitable fiber or similar friction material 35 is secured to the inner face of the outer clutch member 28 to assist in the frictional engagement of the several parts when the device is in use.

The inner clutch member, designated by the numeral 29, comprises the body 36 which is formed with the lateral flanges 37, which flanges are flush with one of the faces of the body, and this face of the body is also provided with the gear teeth 38 which are designed to mesh with the teeth of the gear wheel 9. This body is formed at one end with the convex bight 39 which extends angularly with relation to the vertical axis of the body and is provided with the fiber or similar friction generating material 40 on its outer surface.

The coöperating clutch member which is designated generally by the numeral 41, comprises the hub 42 having formed thereon the flange 43, which flange extends radially therefrom and terminates in the angularly extending flange 44, the outer face of which inclines as at 45 and thence turns downwardly and inclines in the opposite direction as at 46 to conform to the shape of the outer clutch element 28 hereinbefore referred to. The inner face 47 of the flange 44 also inclines upwardly and outwardly from the flange 43 and conforms to the inclination of the plate 39 of the clutch member 29 hereinbefore referred to. This hub 42 is provided with a suitable bushing 48 which is preferably grooved as at 49 to provide space for lubricant, and it will thus be seen that the shaft 1 will be free to turn within the hub without rotating the same. Keyed or otherwise secured to the hub in any suitable manner is the wheel 50 which is to be driven, and this wheel may be a pulley or gear wheel, whichever is best suited to the purpose of the user.

It will be apparent from the foregoing that in use when the user desires that the wheel be rotated, the controlling lever is thrown so as to carry the ring or port toward the clutch which will cause the rollers 15 carried by the levers 14 to move the levers on their pivots and thereby lower the inner ends thus causing the arm 22 to move downwardly which will rotate the wheel 9 through the medium of the shaft 8, and this wheel will, upon movement in that direction, cause the jaw members 28 and 29 to close on the flange 44 of the coöperating clutch member. Thus it will be seen that the jaw members will frictionally engage the flange and firmly lock the whole so that the flange will be driven in the direction of rotation of the clutch, which will also rotate the hub 42 and thereby drive the power wheel 50. When it is desired that the wheel 50 stop motion, the ring 27 is moved outwardly which will withdraw the cone 25 and thereby permit the levers 14 to move inwardly, which movement will cause the wheel 9 to rotate in the opposite direction and thereby loosen the jaw member on the flange 44. In this way it will be clearly apparent that a particularly simple and efficient clutch is provided which will establish a substantially rigid communication between the driver and the driven member so that any danger of slipping is eliminated.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A clutch of the character described comprising a spider; said spider comprising a hub secured to a drive shaft; arms formed on the hub and extending radially therefrom; said arms being slotted longitudinally; the slots extending in a plane parallel with the longitudinal axis of the hub; clutch jaws slidable in the slots; gear teeth carried by the clutch jaws; gear wheels mounted in the slots; said gear wheels meshing with the gear teeth and designed to move the clutch jaws upon rotation; a coöperating clutch element; a flange on the coöperating clutch element; said flange extending between the clutch jaws and being arranged to be frictionally engaged thereby; shafts on which the gear wheels are supported; an arm on said shaft; stems connected to said arm; levers connected to the opposite ends of said stems, and means to operate the stems and levers whereby the arms will be operated thereby causing the wheels to rotate and the clutch jaws to engage the flange.

2. A clutch of the character described comprising a spider; said spider comprising a hub; said hub secured to a drive shaft; arms formed on the hub, and extending radially therefrom; said arms being slotted longitudinally; the slots extending in a plane parallel with the longitudinal axis of the hub; clutch jaws slidable in the slots; gear teeth carried by the clutch jaws; gear wheels mounted in the slots; said gear wheels meshing with the gear teeth and designed to move the clutch jaws upon rotation; a coöperating clutch element; a flange on the coöperating clutch element; said flange extending between the clutch jaws and being arranged to be frictionally engaged thereby; shafts on which the gear wheels are supported; an arm on said shaft; stems connected to said arm; levers connected to the opposite ends of said stems; and means to operate the levers and stems whereby the arms will be operated; thereby causing the wheels to rotate and the clutch jaws to engage the flange and means mounted on said stems for regulating the rotation of the gear wheels thereby allowing the clutch jaws to be adjusted with relation to the coöperating clutch element.

3. A clutch of the character described comprising a spider; said spider comprising a hub secured to a drive shaft; radially extending arms formed on the hub; said arms being slotted longitudinally; the slots extending in a plane parallel with the longitudinal axis of the hub; clutch jaws slidable in said slots; gear teeth carried by the clutch jaws; gear wheels mounted in said slots and meshing with the gear teeth to move the jaws upon rotation; a coöperating clutch element, a flange formed on said coöperating clutch element; said flange being substantially triangularly shaped and having an inner and two working faces; the clutch jaws being designed to engage the working faces of the flange; and means operatively connected with the gear wheel to cause the same to rotate thereby causing the clutch jaws to engage the flange.

In testimony whereof I affix my signature in presence of two witnesses.

PAUL P. ALIEX.

Witnesses:
JOSEPH V. RORKE,
PAUL SANSOME.